United States Patent [19]

Overfield

[11] Patent Number: 5,598,577

[45] Date of Patent: Jan. 28, 1997

[54] COMPUTER SYSTEM WITH AUTOMATIC DRIVE MODEL ID RECOGNITION AND DRIVE TYPE ADAPTATION

[75] Inventor: Anthony L. Overfield, Austin, Tex.

[73] Assignee: Dell USA, L.P., Austin, Tex.

[21] Appl. No.: 569,309

[22] Filed: Dec. 8, 1995

Related U.S. Application Data

[63] Continuation of Ser. No. 243,219, Apr. 6, 1994, abandoned, which is a continuation of Ser. No. 814,026, Dec. 26, 1991, abandoned.

[51] Int. Cl.$^6$ .............................. G06F 13/10; G06F 9/00
[52] U.S. Cl. ..................... 395/830; 395/828; 395/833; 395/427; 395/428; 395/442; 395/497.01; 395/651; 364/243; 364/DIG. 1; 364/964; 364/DIG. 2
[58] Field of Search ................................ 395/700, 427, 395/428, 442, 497.01, 833, 828, 830; 364/243, 964

[56] References Cited

U.S. PATENT DOCUMENTS

| | | | |
|---|---|---|---|
| 4,403,303 | 9/1983 | Howes et al. | 364/900 |
| 4,494,156 | 1/1985 | Kadison et al. | 360/48 |
| 4,718,064 | 1/1988 | Edwards et al. | 395/500 |
| 4,727,512 | 2/1988 | Birkner et al. | 395/500 |
| 4,773,036 | 9/1988 | Berens et al. | 364/900 |
| 4,866,601 | 9/1989 | DuLac et al. | 395/700 |
| 4,928,193 | 5/1990 | Agoglia et al. | 360/78.04 |
| 5,097,439 | 3/1992 | Patriquin et al. | 364/DIG. 2 |
| 5,128,995 | 7/1992 | Arnold et al. | 380/4 |
| 5,214,695 | 5/1993 | Arnold et al. | 380/4 |

OTHER PUBLICATIONS

Wes E. Meador, "Disk Array Systems", IEEE, ©1989, pp. 143–146.

3rd Edition Que's Computer User's Dictionary, ©1992, pp. 287–289.

Peter Norton, "ROM BIOS Extensions for the PC AT", Fall 1985, B Y T E, Inside the IBM PCs, pp. 59–63.

Jon Schiell and John Markoff, "Adding a Hard Disk to your PC AT", Fall 1985, B Y T E, Inside the IBM PCs, pp. 159–164.

Deitel, H. M., "Operating Systems", 1990, p. 6.

"Programmer's Problem Solver for the IBM PC, XT, & AT" by Robert Jourdain, pp. 10, 11, and 241–251, 1986.

"Que's Computer User's Dictionary", 1992 Que Corporation pp. 287–289.

Primary Examiner—Kevin A. Kriess
Assistant Examiner—Michael T. Richey

[57] ABSTRACT

A computer system in which the system software (while running as an overhead process which is not directly under control of the user) queries a disk drive to determine its model. The system software checks the corresponding response string with reference to a table of recognized model strings (in encrypted format). If the drive's response string is recognized in this table, then the drive parameters can be set appropriately. If not, then this portion of the system software will not set the drive parameters; instead, the normal manual setup procedure can be used.

20 Claims, 8 Drawing Sheets

COMPUTER SYSTEM WITH AUTOMATIC DRIVE MODEL ID RECOGNITION AND DRIVE TYPE ADAPTATION

CROSS-REFERENCE TO RELATED APPLICATIONS

This application is a continuation of application Ser. No. 08/243,219, filed Apr. 6, 1994, now abandoned, which is a continuation of application Ser. No. 07/814,026, filed Dec. 26, 1991, now abandoned.

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to small personal computers, and to methods for using them.

The innovations disclosed in the present application provide computer systems (especially very small portable personal computers) which have advantageous new capabilities for disk drive management. To better explain the significance and advantages of these innovations, the following paragraphs (down to page 5) will review some technological context. This technological context is not necessarily prior art, but is intended to help in pointing out the disclosed inventions.

Laptop and Smaller Computers

Portable personal computers were introduced in the early 1980s, and proved to be very useful and popular. As this market has developed, it has become increasingly dear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Note that the hard drive in a notebook computer is normally bolted in, and is not intended to be readily changed by the user. Thus, since the choice of hard drives is controlled by the manufacturer, the system does not have as difficult a recognition problem as it would if users could freely introduce new hard drive modules.

Basic System Software

Whatever hardware is used will have its own procedures to return to a known state when a reset occurs. However, at some point these procedures end, and the CPU is ready to begin execution of instructions.

At this point the system performs various overhead tasks under software control. These may include surveying the system configuration, sanity checks, etc.

"Basic Input/Output System" Software (BIOS)

In modern personal computers, the initial target address is normally used as the entry point to a "basic input/output system" (BIOS) program. The BIOS program contains frequently-used routines for interfacing to key peripherals, for interrupt handling, and so forth.[1] In addition to these basic input/output routines, the "BIOS" software also includes some key pieces of overhead software, such as configuration update and the power-on-self-test (POST) routines.[2] The BIOS software will also launch the machine into the operating system software.[3] (Thus, the term "BIOS" has become somewhat broader nowadays, and normally refers to this whole collection of basic system routines.)

[1] Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," Byte, April 1989, pp. 303ff.
[2] The POST routines provide an extensive check for hardware integrity.
[3] Depending on how the system has been set up, the BIOS software may direct program execution into DOS, Unix, PS/2, a DOS variant, or another operating system. However, the choice of operating system is not particularly relevant to the inventions described in the present application.

Disk Drive Management in Personal Computers

In standard personal computers, the operating system must be aware of a significant number of disk parameters, including the heads, cylinders, sectors, and interleave. See generally Rosch, "Sectors, tracks, and heads," PC SOURCES vol. 2 no. 1 (Jan. 1991), at 378, which is hereby incorporated by reference; and Roberts, "Finding disk parameters," PC TECH JOURNAL, vol. 4 no. 5 (May 1986), at 112ff, which is hereby incorporated by reference.

Normally, the user advises the system software of disk parameters, as follows:

When the computer is booted, it always offers the user the opportunity to branch into a SETUP utility. Also, if the computer detects corruption of the configuration memory data, or if the computer detects a mismatch between the configuration memory data and the installed equipment, or (sometimes) if a hardware error is encountered during the POST routines, the POST software will invite the user to enter the SETUP routine.

When the user runs the SETUP routine, it displays a table of numbered drive types, with parameters for each. The user is asked to select one of these drive types. (Recent SETUP routines will query the drive to ascertain its parameters, and will suggest a choice to the user.) After the user selects a drive type, the relevant information is stored in the configuration memories in nonvolatile memory (battery-backed CMOS), and the user is prompted to reboot the computer.

Selecting a drive type is confusing to new users, and presents some possibility for error. Consequences of such errors can easily include inoperability or loss of data, ff an inexperienced user gets into manual SETUP without realizing what he is doing.

The Integrated Drive Electronics (IDE) Disk Interface

In recent years, interfacing to hard disk drives has been greatly simplified by the rapid introduction of Integrated Drive Electronics (IDE) disk drives. An IDE drive includes the drive controller electronics integrated with the drive, so the interface to it can be a high-level digital interface. As drives have evolved, the interface is becoming standardized; this evolving interface is referred to as the AT Attachment interface, hereinafter "ATA" and has been proposed for adoption as an American National Standards Institute, hereinafter ANSI standard. See generally Alford, "The IDE Hard Disk Drive Interface," BYTE magazine, March 1991 (vol. 16 No.3), at 317ff, which is hereby incorporated by reference.

An IDE drive controller does handle many low-level tasks (such as soft error detect and retry), and some can even remap the drive sectors invisibly to the operating system; but (at least with current IDE interface definitions, and with current operating systems such as DOS, OS/2, and UNIX) the IDE controller does not fully mask the drive specifics from the operating system. Thus, the CPU, under control of the system software, still needs to be able to ascertain the drive parameters.

Under the evolving ATA standard, one of the commands which an IDE drive controller will recognize is an identity query. In response to such a query, the controller will output a block of data which includes the drive's model number and serial number, as well as parameters for the drive.

Computer System with Automatic Drive: Model ID Recognition and Adaptation

The present application discloses a computer system in which the system software (while running as an overhead process which is not directly under control of the user) queries a disk drive to determine its model. The disk drive returns a data field which includes an ID string, and the system software compares this string against a table of recognized model strings. If the drive's response string is recognized in this table, then the drive parameters can be set appropriately. If not, then this portion of the system software will not set the drive parameters. (However, the normal manual setup procedure can still be used.)

The presently preferred embodiment implements this idea in an ISA architecture. In this case the POST process (stored in the BIOS ROM) queries the hard disk to determine what kind it is and automatically sets the CMOS hard disk drive type to its corresponding value. Previously, this required knowing the CMOS drive type number of the hard disk, or knowing the correct drive parameters and searching through all available CMOS drive types to find the one that corresponds.

Limited Use of Drive's Self-Description Capability

When the CPU is running the innovative software, it issues an identification query to the drive: for example, with an IDE drive, the CPU issues an "IDE_identify" command. In response to this command, an IDE drive will return a block of data (in a format substantially defined by the ATA standard) which includes a model-unique identification string. That is, this string will specify the manufacturer's model number (e.g. "Conner Peripherals 42MB—CP2044") at byte $36_H$ of the block of 512 bytes.

The block of data returned by an IDE drive also includes drive parameters. However, the present invention does not use these drive parameters (except, optionally, as additional bits of input to the string match, as detailed below.

The disclosed innovative architecture also provides additional options for exploitation. Thus, for example, an IDE controller might be running an emulation, which could be bypassed by software according to the present inventions, if the IDE's emulation would not produce optimal efficiency for a particular application.

Encryption

Preferably the table of permissible model strings is stored in encrypted format. This prevents competitors from simply reading out the list of permissible drive models (which would disclose supplier information). In this case the comparison operation must be adapted accordingly.

In the presently preferred embodiment, the table of permissible model strings is encrypted using a very simple algorithm: the values are simply XORed with a constant. This provides some minimal impediment to competitors' inspection.

The string returned by the disk drive is tested with reference to the encrypted entries. (The comparison operation itself includes translation steps which permit the unencrypted returned string to be compared, without a separate transformation operation, to the encrypted entries in the table.)

Launch from POST

The innovative routine is called out of POST. It recognizes the drive. It looks up the optimal type number for that drive, and writes the nonvolatile configuration memory accordingly. However, if this routine does not recognize the drive model string, it changes nothing.

As part of the POST routines, the innovative procedures will run every time the computer is booted. However, these procedures do not add any significant delay to the boot process.

Sequence of POST Steps

The innovative drive-recognition steps are preferably performed before any disk-access operations are needed. Thus, in the presently preferred embodiment, these drive-recognition steps are performed just after the reset and self-test of the drive is initiated.

Updating

To obtain the maximum benefit, the table of hard drive models in the system software should be updated to recognize new drive models, before systems with the new drive model are released. Thus, in practice, the engineering team which evaluates a new drive for possible inclusion will add the additional recognition entry into the BIOS. By the time the new drive model is cleared for shipping, the corresponding recognition capability is already in the BIOS.

Currently there are ten different drive models in the recognition table, but of course this is expected to change.

Forward Compatibility.

The disclosed system and method provides improved forward compatibility. New drive models continue to be introduced, and there remains at least a theoretical possibility that a new drive model might match an existing model in some parameters, but not in all. Thus, recognition by parameter comparisons raises a risk of misrecognition.

Of course, as new drive models are introduced, the BIOS software can be updated accordingly.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Sample Hardware Implementation

The presently preferred embodiment has been implemented on several different computer systems. The primary disclosed embodiment relates to the Dell 320N computer. This is a notebook computer, with an external closed size of about 8.5×11×2 inches.

Figure 4:
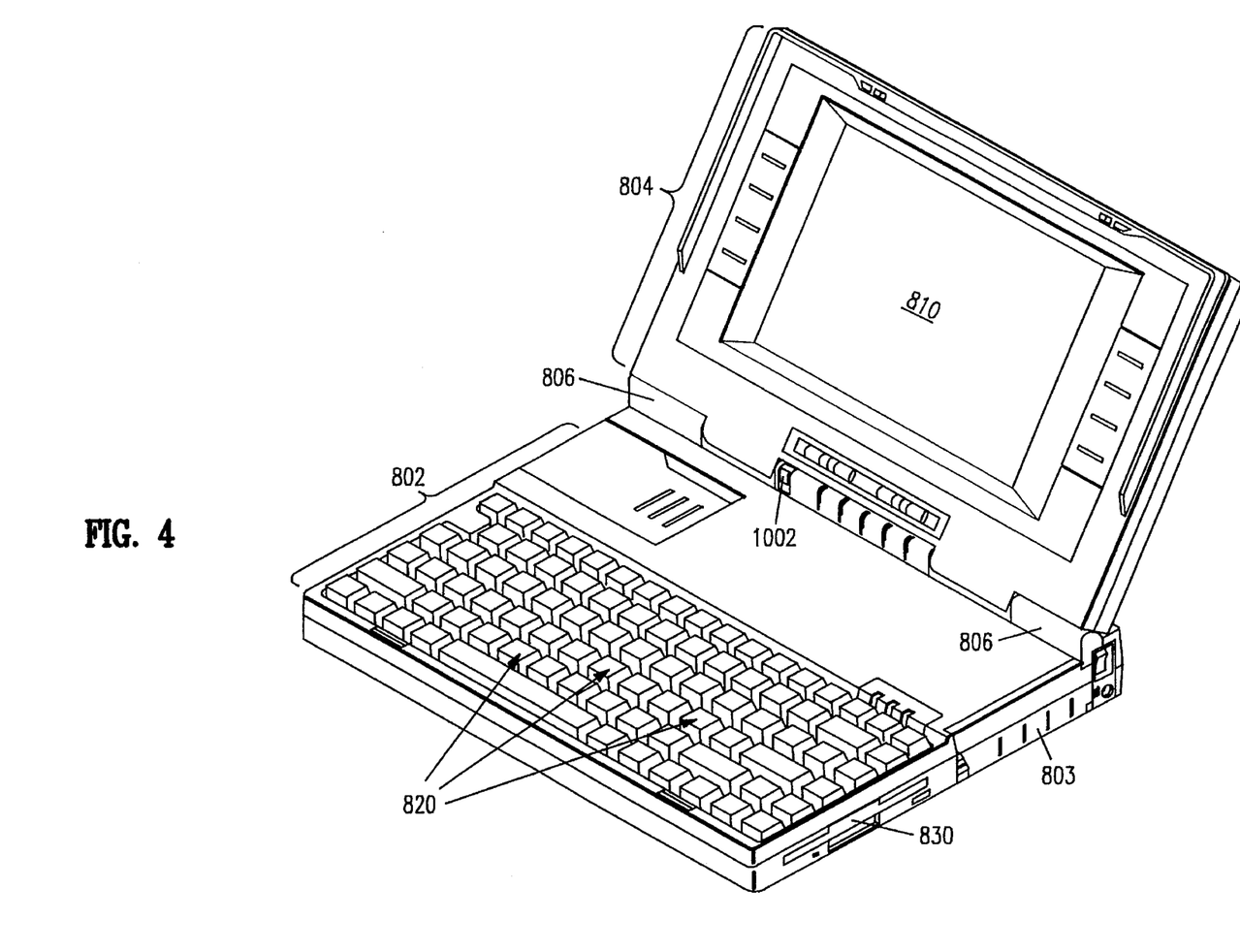
FIG. 4 shows the notebook computer of the presently preferred embodiment.

FIG. 4 shows a perspective view of the notebook computer of the presently preferred embodiment in the open position. Visible elements include case 802, cover 804, hinges 806, display screen 810, keyboard 820, floppy disk drive 830, and battery door 803 (which covers the receptacle for the rechargeable battery pack).

The microprocessor 300 is an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

In the presently preferred embodiment, an HT21 chip 310, from Headland Technologies, is used to provide a variety of peripheral support functions to the main microprocessor. These include bus management, memory management, interrupt control, and DMA control. Serial port management and keyboard interface, and other I/O management functions, are provided by a VTI 82C106 combination chip 350. Of course, other implementations of support logic and glue logic can be used if desired, within this well-known architecture.

FIGS. 3A–3E show the detailed structure of the preferred hardware embodiment.

This computer is a notebook computer, which includes a compact keyboard and screen in a rugged plastic case with a battery power supply.

Figure 1:
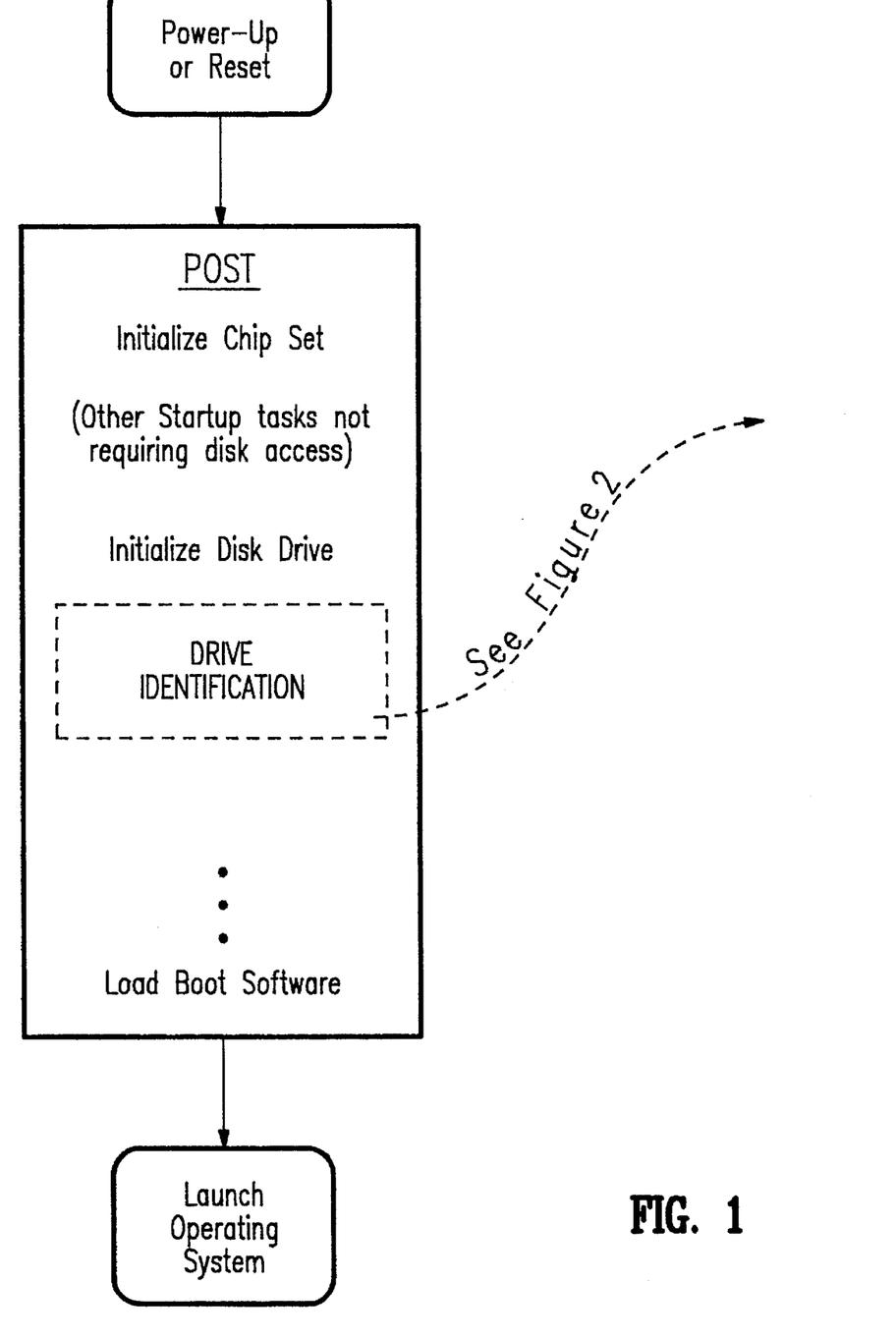
FIG. 1 is a flow chart showing the general sequence of some of the key operations in the power-on-self-test (POST) operations of a sample microcomputer system, and shows the general point within POST where the innovative operations are preferably performed.
Figure 2:
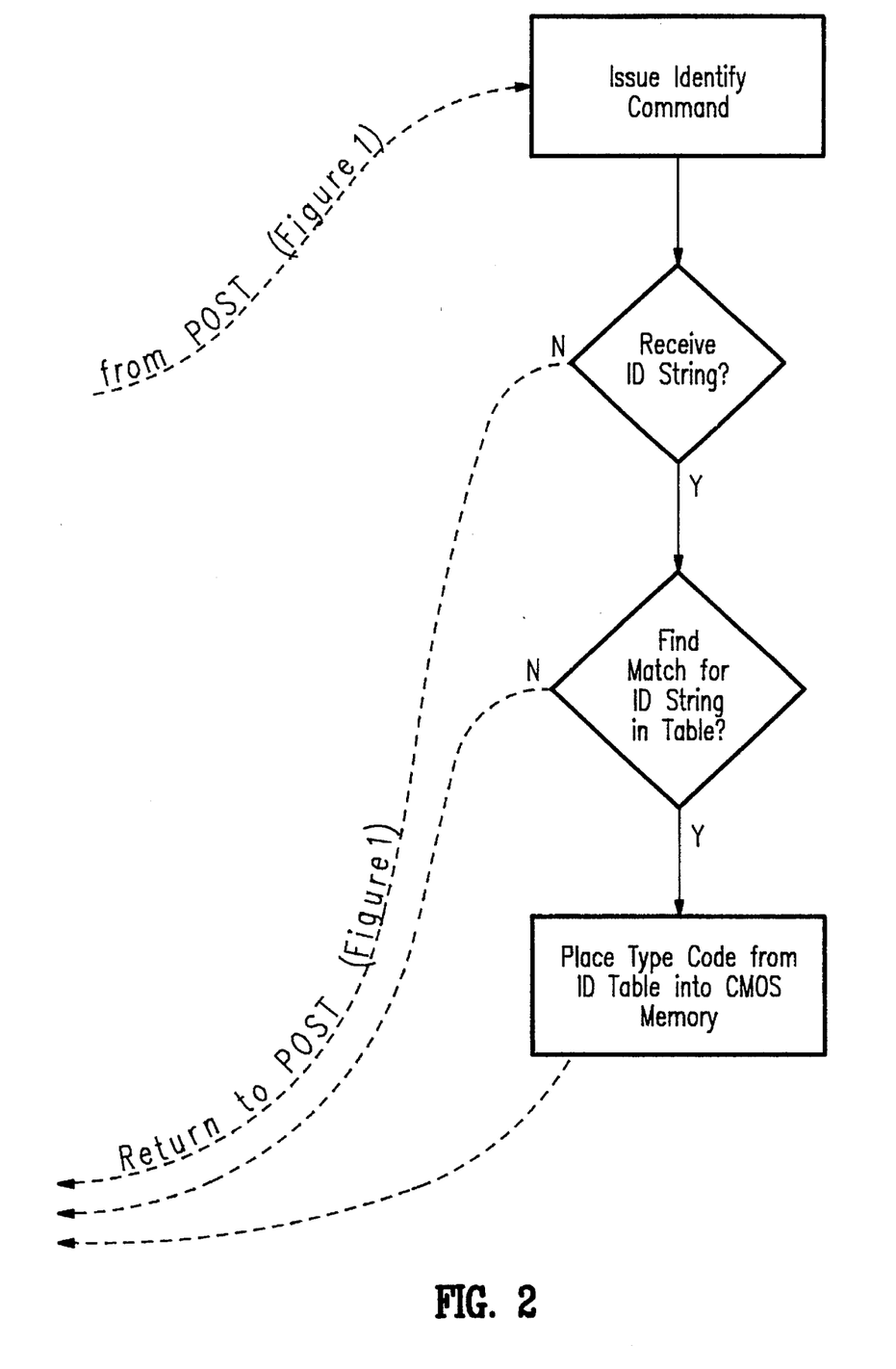
FIG. 2 is a flow chart showing the general sequence of the innovative drive-adaptation operations.
Figure 3A:
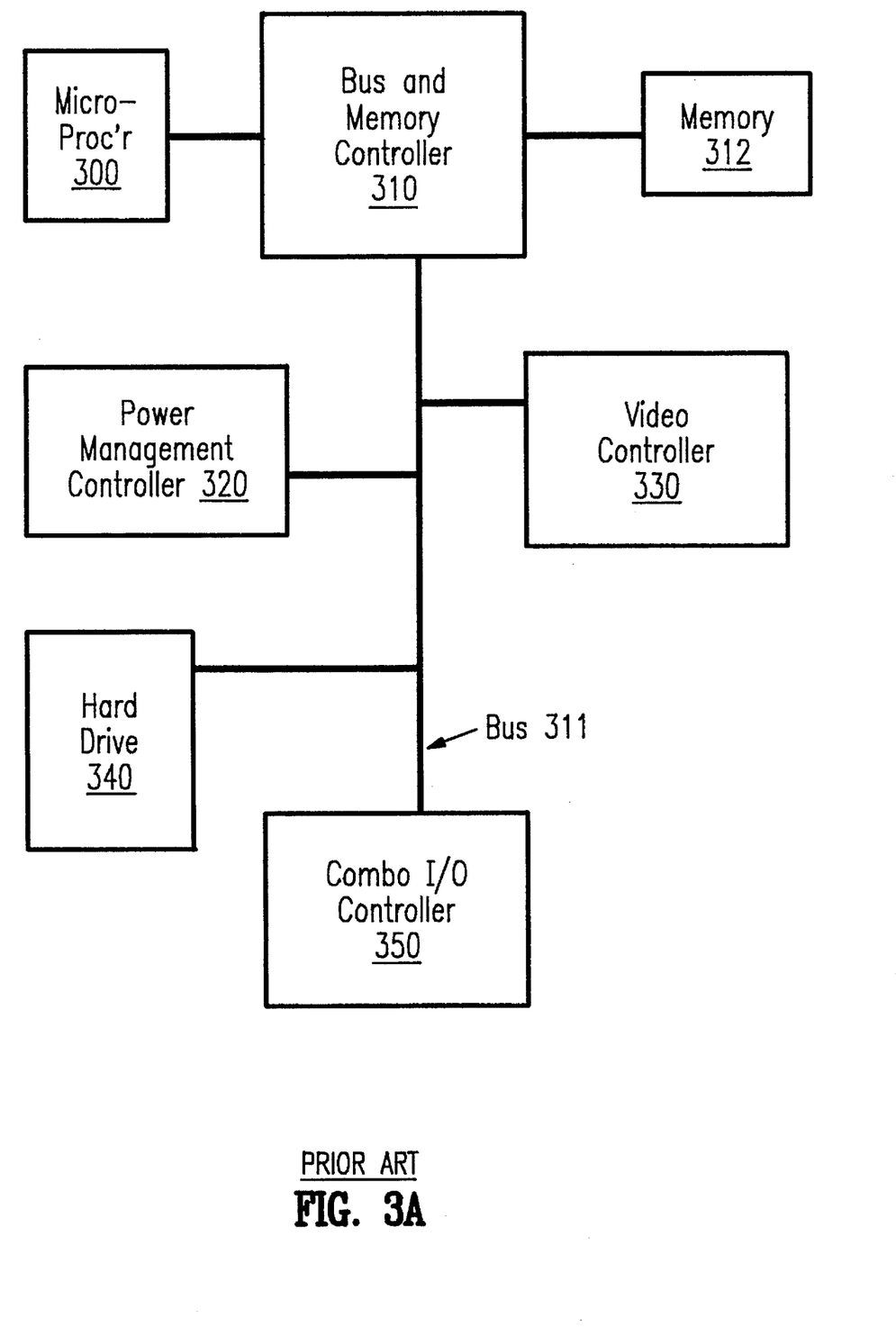
FIGS. 3A–3E show the detailed structure of the preferred hardware embodiment.

FIG. 3A gives an overview of the principal electronic components of hardware architecture.

Microprocessor 300, in the presently preferred embodiment, is a 386SX processor running at a 20 MHz clock rate. This microprocessor accesses bus 311, and memory 312, through controller 310. Bus and memory controller 310, in the presently preferred embodiment, is an HT21 chip from Headland Technologies. This chip provides a variety of peripheral support functions to the main microprocessor, including bus management, memory management, interrupt control, and DMA control.

Bus 311, in the presently preferred embodiment, is an ISA bus. Memory 312, in the presently preferred embodiment, is DRAM, as discussed below.

Figure 3B:
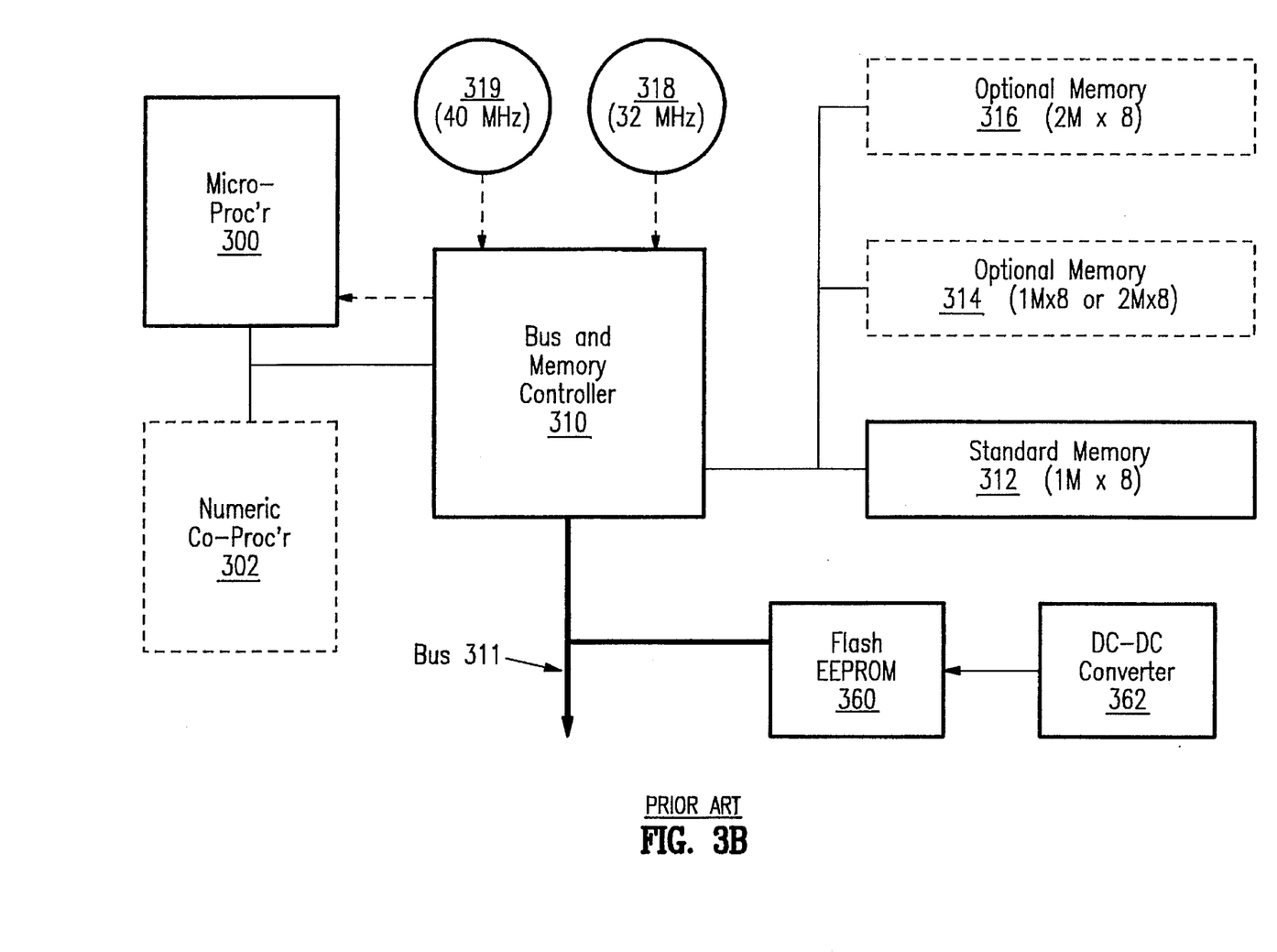
Figure 3C:
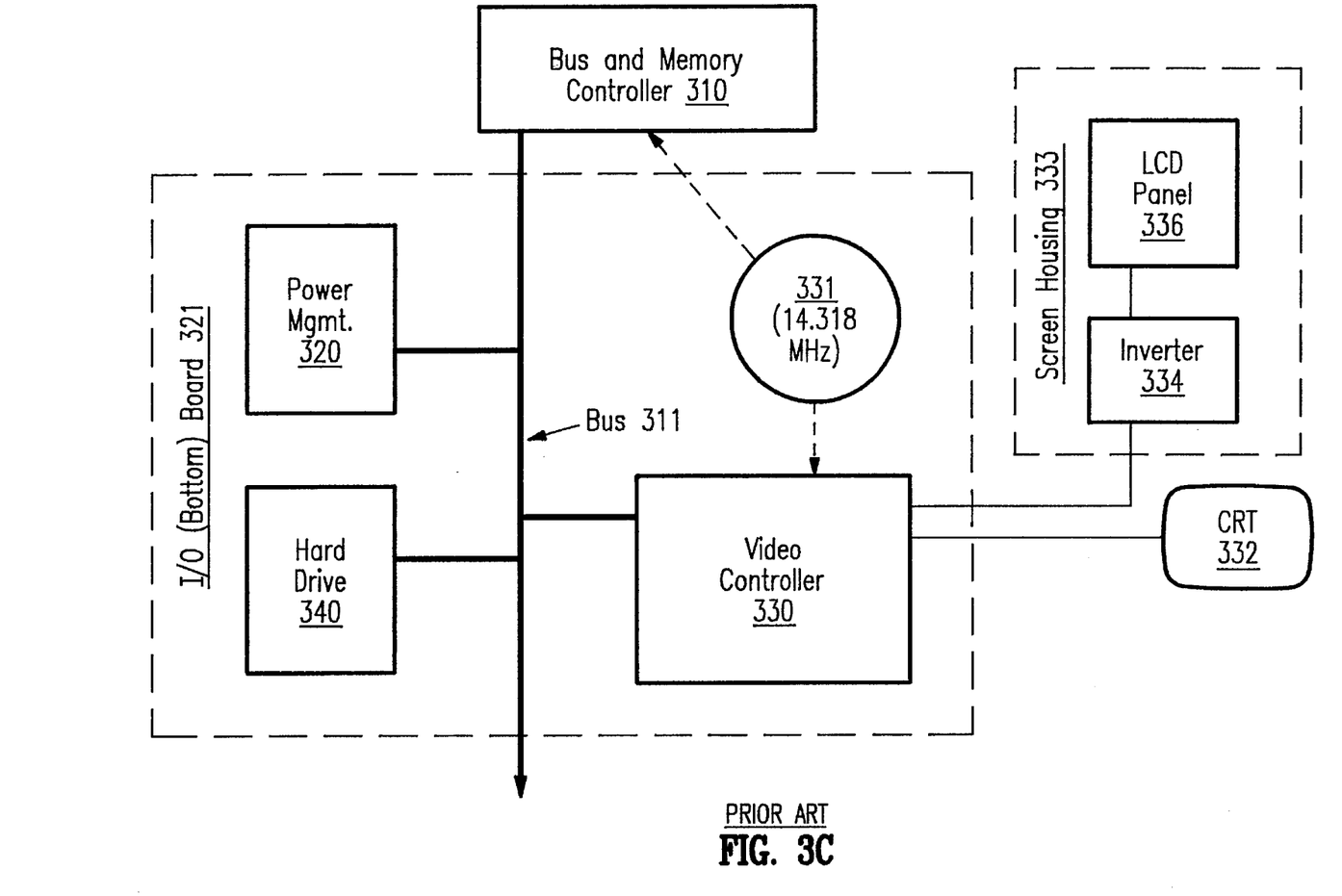

Video controller 330 is, in the presently preferred embodiment, a VGA chip, and is connected to additional components as shown in FIG. 3C below. This is implemented as a WD 90C20 VGA controller chip, in the presently preferred embodiment; but of course other components can optionally be used instead.

Figure 3D:
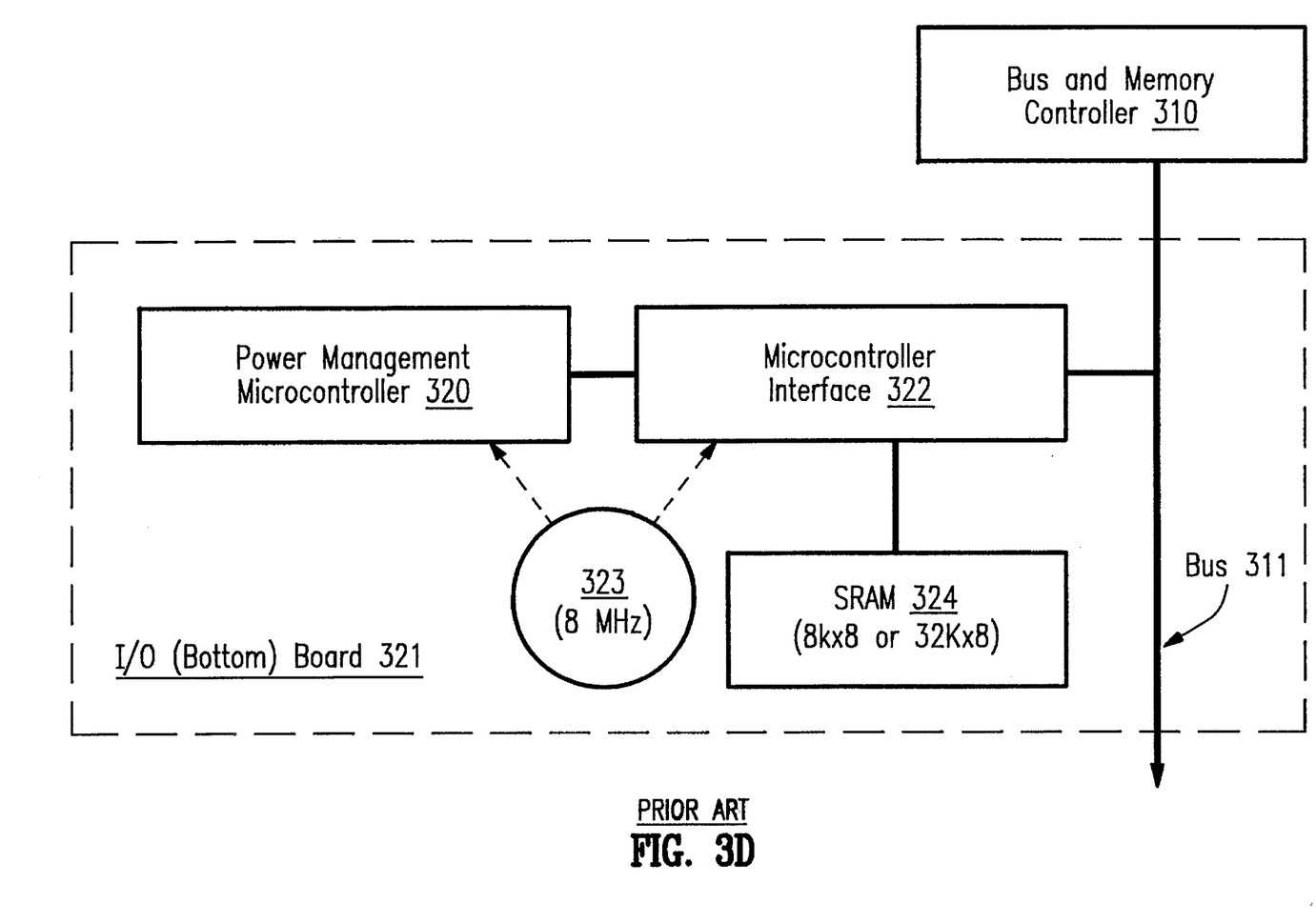

Power Management Controller 320 is a microcontroller, in the presently preferred embodiment, and is connected to additional components as shown in FIG. 3D below.

Hard disk drive 340, in the presently preferred embodiment, is a ruggedized 2½" IDE drive, such as the Conners Peripherals CP2044 42MB 2.5" hard disk. (Other sizes are also available.)

Figure 3E:
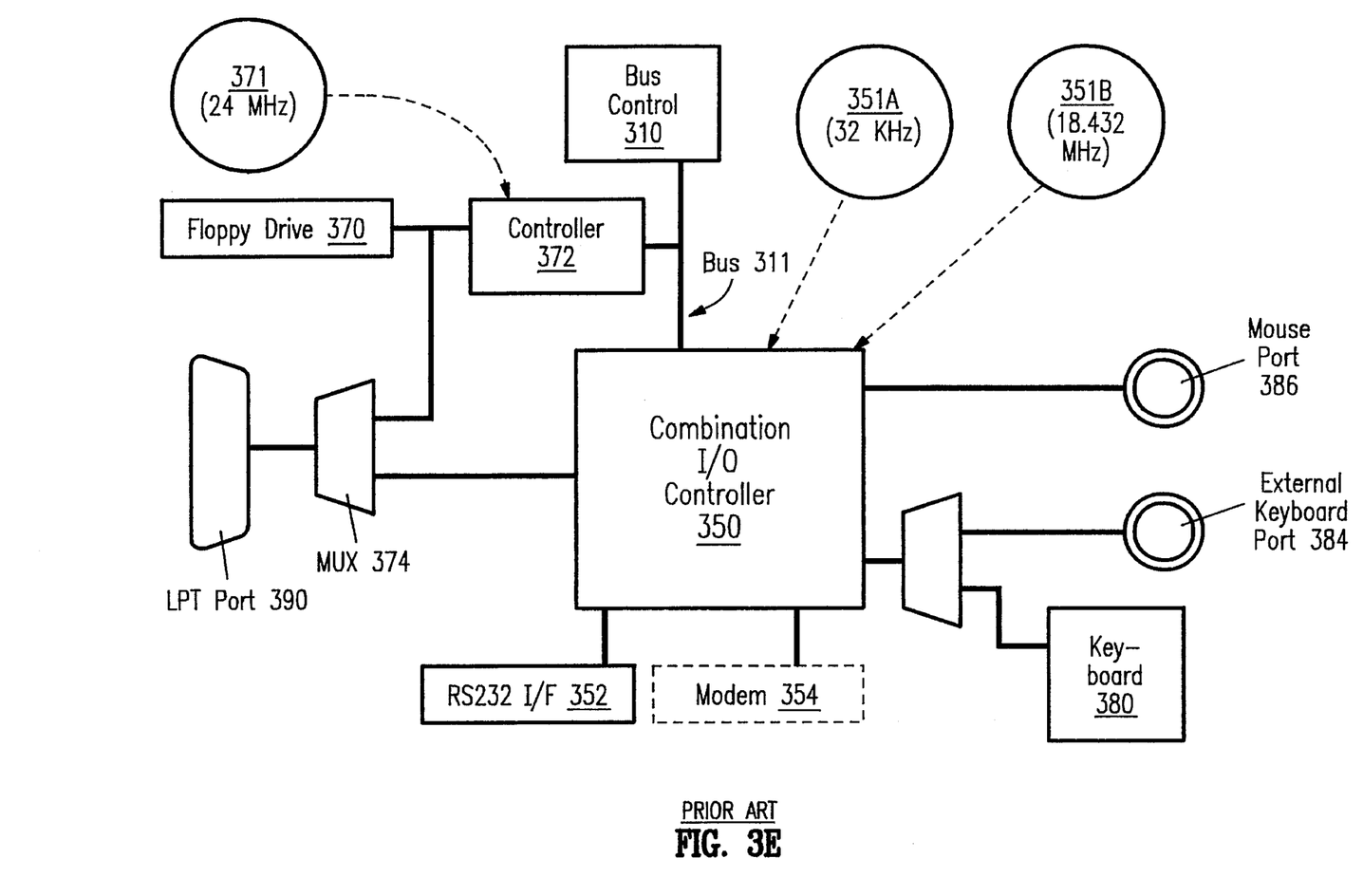

Serial port management and keyboard interface, and other I/O management functions, are provided, in the presently preferred embodiment, by a VTI 82C106 combination chip 350. (Of course, other implementations of support logic and glue logic can be used if desired, within this well-known architecture.) Combination I/O Controller 350 is connected to additional components as shown in FIG. 3E below.

FIG. 3B shows additional details of the connections of microprocessor 300 and bus controller 310. The microprocessor 300 is connected in parallel with a socket for an optional numeric co-processor 302 (e.g. a 387SX chip). Bus controller 310 receives two oscillator inputs. A 40 MHz crystal-controlled oscillator 319 provides a signal which is divided down to provide the dock for microprocessor 300. A 32 MHz crystal-controlled oscillator 318 provides a signal which is divided down to provide the clock for bus 311.

The standard component of memory 312 is one megabyte of DRAMs, 8 bits wide. Sockets are provided for optional expansion memory 314 (1M×8 or 2M×8), and for optional expansion memory 316 (2M×8). Both of these optional expansion memories are connected in parallel with memory 312 (except for slightly different address line connections).

Flash EEPROM 360 provides a rewritable boot memory. (The operation of this memory is described in detail in commonly owned application 707,121, filed May 29, 1991, entitled "Computer System with Restorable Basic Firmware" (DC-200), which is hereby incorporated by reference.) When the flash memory 360 must be programmed, DC-DC converter 362 generates a 12-Volt programming voltage from the 5-Volt supply.

The hardware system of the presently preferred embodiment uses only three circuit boards for all components other than the external power supply. The components shown in FIGS. 3B and 3E are included on a common circuit board. However, FIGS. 3C and 3D show components which are on an I/O (bottom) circuit board 321 or inside the screen housing 333.

FIG. 3C shows additional details of the connections of the video controller 330. A 14.318 MHz crystal-controlled oscillator 331 provides a reference frequency to video controller 330 and to bus controller 310. The video controller provides video output to inverter 334 and LCD display panel 336. (This is a Sharp VGA flat panel display, in the presently preferred embodiment, but of course other displays can be substituted.) A connection is also provided, in the presently preferred embodiment, for an external CRT monitor 332, which, if connected, can also be supplied with video signals from video controller 330.

FIG. 3D shows additional details of the connections of the power management microcontroller 320. In the presently preferred embodiment, this is a National Semiconductor COP888CF series microcontroller, which is connected to receive various inputs for power-monitoring. An ASIC 322 provides interface logic, including sequential logic, for interfacing the microcontroller 320 to the system bus 311. An 8 MHz crystal-controlled oscillator 323 provides a clock signal to microcontroller 320 and interface chip 322. An SRAM 324 (which may be 8K×8 or 32K×8) is also accessed through the interface chip 322. This provides local memory which the microcontroller 320 can use. U.S. patent application 07/655,889, filed Feb. 14, 1991 and entitled "Portable Computer with BIOS-independent Power Management" (DC-172), provides extensive detail concerning power management microcontroller 320 and ASIC 322. This application is hereby incorporated by reference.

FIG. 3E shows additional details of the connections of the combination I/O controller 350. This chip receives dock inputs from an 18.432 MHz crystal-controlled oscillator 351B, and from a 32 KHz crystal-controlled oscillator 351A.

This chip, in the presently preferred embodiment, is a VTI 106; but of course a variety of other combination I/O management chips are available from Headland, Chips & Technologies, and other vendors, and other such chips can optionally be designed in.

I/O controller 350 is connected to receive input from mouse port 386.

I/O controller 350 is also connected to receive input from built-in keyboard 380, or from an external keyboard when one is plugged into external keyboard port 384.

I/O controller 350 is also connected to communicate with an internal modem 354, if one is installed.

I/O controller 350 is also connected to communicate, through RS232 interface 352, with a serial port connector (not shown).

I/O controller 350 is also connected to communicate, through multiplexer 374, with printer (parallel) port 390. Note that multiplexer 374 also, in the presently preferred embodiment, permits the floppy disk controller 372 to send and receive floppy disk interface signals over the parallel port connector 390. This novel feature permits an external floppy drive to be connected to the printer port connector 390.

Floppy disk controller 372 interfaces to bus 311, and receives a clock signal from 24 MHz oscillator 371. Floppy disk controller 372 is a standard controller for a 3½" floppy disk drive 370, which, in the presently preferred embodiment, is an Epson 3.5" floppy disk drive unit.

Encryption

The table of permissible model strings, in the presently preferred embodiment, is stored in encrypted format. In the presently preferred embodiment, a very simple encryption is used: the values are simply XORed with a constant ($SA_H$ in the presently preferred embodiment). Alternatively, a more complex encryption scheme can be used if desired; but even this provides some minimal impediment to competitors' inspection.

Software Implementation Details

Following is a sample specific implementation of software portions of the disclosed innovations. This example is intended to better illustrate the disclosed generally applicable innovations, and to comply with the best-mode requirements of U.S. patent law; but of course this specific implementation is subject to change (and will certainly be changed as time goes by), and can be altered, as will be apparent to those skilled in the art, in many details.

The code portions set forth below provide the most relevant portions of the code used, but of course these code portions are used in combination with large additional portions of code. In the presently preferred embodiment, the software structure given below is used in combination with Phoenix™ BIOS code; but several vendors (such as AMI) offer BIOS software, and the disclosed code can be used with another vendor's BIOS code if desired. (Of course, minor adjustments would have to be made to the called routine names, etc.)

Encryption-Related Macros

The following macros hide the hard drive strings from casual

```
XORCH    MACRO    ch
   db    '&ch' xor 5Ah[4]
   ENDM
DRIVEID MACRO    bnum, blen, strng
   db    bnum
   db    blen
   IRPC ch, <strng>
```

```
   XORCH    <!&ch>
   ENDM
   db    0 xor 5Ah
ENDM
```

Drive Identify Table

The following table is an array of Drive Identify structures:
; byte(s)
; 0      CMOS drive type
; 1      Offset in Identify block to compare string to
; 2–? 0 terminated string to compare
```
IDENT_TABLE      label    byte
   DRIVEID    2, 36h, <PrairieTek 20MB - PT120A>
   DRIVEID    17, 36h, <PrairieTek 40MB - PT242A>
   DRIVEID    2, 36h, <Conner Peripherals 20MB - CP2024>
   DRIVEID    37, 36h, <Conner Peripherals 31MB - CP2034>
   DRIVEID    17, 36h, <Conner Peripherals 42MB - CP2044>
   DRIVEID    38, 36h, <Conner Peripherals 63MB - CP2064>
   DRIVEID    39, 36h, <Conner Peripherals 84MB - CP2084>
   DRIVEID    8, 36h, <WDC AB130>
   DRIVEID    19, 36h, <WDC AH260>
   DRIVEID    19, 36h, <AREAL MD2060>
   db    0          ; No more drives to compare to
```

Procedure DO_IDENTIFY

This procedure actually identifies the drive:
```
do_identify    proc near
   pusha
   push ds
   push es
   mov    ax, 9000h       ; RAM to put ID sector in
   mov    es, ax
   mov    ax, 40h         ; ROMDAT (BIOS data variables)
   mov    ds, ax
   mov    ax, 0EC00h      ; identify drive[5]
   mov    dx, 0           ; Drive 0
   call   CBLOAD[6]
   JC     id_error1
   MOV    HDINTR, 0
   CALL   POLOAD          ;write commands to controller
                            and[7]
   JC     id_error2
   CALL   GETINT          ;wait for interrupt, enables
                            ints
   JC     id_error3
   CALL   WFDREQ          ;wait for data request
   JC     id_error4
   cld
   MOV    DX,HDBASE+HDDATA
   mov    di, 0
   mov    cx,256
   rep    insw            ;read 512 bytes of data into
                            buffer
   CALL   CHKERR          ;check controller for error
   JC     id_error5
   mov    al, 0           ; set default to 0[8]
   MOV    AH, HD_IDENT
   CALL   CMOS_Write      ; Write to CMOS
   mov    si,offset IDENT_TABLE
cbad:
   mov    bp,si
   cmp    byte ptr cs:[si],0
   je     id_out
   inc    si
   mov    di,cs:[si]
   and    di,0ffh
   inc    si
cloop:
   mov    al,cs: [si]     ; This code compares a normal
   xor    al,5ah          ; string to an "encrypted"
   inc    si              ; (byte-flipped) one.[9]
   or     al,al
   jz     c_done
   cmp    al,es:[di+1]
   jne    c_bad
   mov    al,cs:[si]
   xor    al,5ah          ; decrypt
   inc    si
   or     al,al           ; (check that the last byte is =
                            (0 XOR $5A_H$))
```

-continued

```
      jz    c_done      ; (check that the last byte is =
                        ;                 (0 XOR 5A_H))
      cmp   al,es:[di]
      jne   c_bad
      add   di,2        ; (check that the last byte is
                        ;                 (0 XOR 5A_H)
      jmp   cloop
c_bad:
      mov   al,cs:[si]
      xor   al,5ah      ; decrypt
      inc   si
      or    al,al
      jnz   c_bad
      jmp   cbad
c_done:
      mov   al, cs:[bp] ; Get desired CMOS type
      MOV   AH, HD_IDENT
      CALL CMOS_Write   ; Write to CMOS
      MOV   AH, CMHDXC  ; Hard disk types (16-47)
      CALL CMOS_Write   ; Write to CMOS
      CMP   AL, 15
      jb    hd_typ
      mov   AL, 15
hd_typ:
      SHL   AL, 4       ; (The particular application
                        ; for which this code is
                        ; written is a notebook
                        ; computer, which can only
                        ; contain one hard drive;
                        ; hence this step stuffs half
                        ; of the Drive type byte, to
                        ; indicate that no second hard
                        ; drive is present.)
      MOV AH, CMHDSK    ;Drive-type byte (0-15)
      CALL CMOS_Write   ;Write to CMOS
id_ok:
      mov   al,80h
      call  checksum_cmos
      pop   es
      pop   ds
      popa
      ret
id_out:
      jmp id_ok
id_error1:
      jmp id_out
id_error2:
      jmp id_out
id_error3:
      jmp id_out
id_error4:
      jmp id_out
id_error5:
      jmp id_out
do_identify endp
```

[4]This performs a byte-by-byte XOR, to conceal the table of drive-ID strings from casual observation.
[5]This argument to CBLOAD (and thence to POLOAD) specifies the identify routine.
[6]Routine CBLOAD (not shown) is a standard Phoenix BIOS routine. It provides a front-end for command-handling routines, which is used, in this case, to load up the task file.
[7]Routine POLOAD is another standard Phoenix BIOS routine, which actually issues the appropriate commands. Routines CBLOAD and POLOAD are called for most commands that are issued, including reads, writes, etc. What causes an identify operation to be launched, rather than a read, write, etc., is the value which was loaded into register AX before CBLOAD was called.
[8]This, in effect, sets the drive type to "unrecognized" as a default. However, note that at this point this value is going into an OEM-reserved location, not into the ISA table.
[9]As noted, data is returned in byte-swapped-word format. The sample code given here simply performs the comparison within this format.

Note that a zero is used to mark the end of the string.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

The preferred embodiment is primarily directed toward an "AT-compatible" architecture, in which the disclosed inventions are advantageously applied to getting the correct value into the configuration memory. While the disclosed innovations are particularly advantageous in such a context, they can also be adapted to quite different architectures. For example, the disclosed innovations can be used in any other computer which uses IDE drives (e.g. in a workstation).

In addition, it should be noted that the disclosed innovations are not limited to use with the ATA interface, and are not necessarily limited to use with IDE drives. The disclosed innovations can also be applied to other drive controllers which provide a drive-specific self-identifying string in response to an identity query. (For example, some ESDI controllers have the capability to return a controller-specific self-identifying string; and at least some of the disclosed innovations may be adaptable to other controllers with a Western-Digital-type interface.

It should be noted that, although the presently preferred embodiment launches the drive-recognition procedure out of POST, the innovative steps could optionally be commenced in other ways (for example, as part of the initialization of a device driver).

In an alternative embodiment, the table format and string compare operation are modified to compare not only the drive model ID, but also the other parameters returned by the drive. This alternative embodiment helps to ensure against the risk that a manufacturer might change drive parameters without changing the drive model number. Of course, the serial number field is preferably omitted from this comparison, since it is different for each individual drive.

In a further contemplated alternative embodiment, additional comparisons can be done on the serial number field. However, this alternative is not preferred, since manufacturers tend to be somewhat inconsistent in the progression of their serial numbers.

In the present embodiment, the normal SETUP routine in the BIOS ROM remains available, in case the described software is unable to recognize the drive, so that the user can still call the SETUP utility to set the drive type manually. But this ability can be removed in an alternative embodiment.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. In a computer system having a disk drive and having a configuration memory, a method of conditionally specifying to the computer system a plurality of drive parameters appropriate for the disk drive, comprising the steps of:

sending a model-identification-query to the disk drive, said model-identification-query causing the disk drive to return a model-identification-string which identifies the disk drive's manufacturer and model number:

comparing the model-identification-string returned from the disk drive against a plurality of entries within a recognition table, said recognition table containing an entry for each of a plurality of disk drives, by vendor and model number thereof, which are each known to perform satisfactorily with the computer system, said recognition table being pre-stored within the computer system and containing, for each entry, a field specifying a permissible model-identification-string for the respective entry and a field specifying a corresponding drive-type-number for the respective entry, said comparing step for finding an entry within the recognition table which corresponds to the returned model-identification-string, if such a matching entry is present within the recognition table, and otherwise for determining that no matching entry is present within the recognition table;

retrieving, upon finding a matching entry within the recognition table, the drive-type-number corresponding thereto;

storing, upon retrieving a drive-type-number from the recognition table, the retrieved drive-type-number into the configuration memory of the computer system; and preventing upon determining that no matching entry is present within the recognition table, a user of the computer system from manually storing a drive-type-number into the configuration memory of the computer system;

wherein the drive parameters appropriate for the disk drive are specified to the computer system by reference to a pre-stored configuration table using the retrieved drive-type-number previously stored within the configuration memory, said configuration table containing, for each drive-type-number from a group of known drive-type-numbers, a corresponding plurality of drive parameters.

2. A method as in claim 1 wherein the comparing step comprises the steps of:

encrypting the model-identification-string returned from the disk drive, thereby forming an encrypted returned model-identification-string;

comparing the encrypted returned model-identification-string against entries within the recognition table until a matching entry is found, if at all, said entries within the recognition table containing permissible model-identification-strings which are pre-encrypted in like manner as in the encrypting step; thereby preventing the direct reading of permissible model-identification-strings within the recognition table unless the encrypting step is known.

3. A method as in claim 1, wherein the model-identification-string returned from the disk drive includes a plurality of drive parameters appropriate for the disk drive; and wherein each of the plurality of permissible model-identification-strings stored within the recognition table includes a plurality of drive parameters appropriate for a disk drive corresponding to the respective entry; and wherein the comparing step finds a matching entry within the recognition table only if the plurality of drive parameters contained within the returned model-identification-string matches an entry within the recognition table.

4. A method as in claim 2 wherein the encrypting step comprises the step of performing, for each byte of the returned model-identification-string, a byte-flip operation.

5. A method as in claim 2 wherein the encrypting step comprises the step of performing, for each byte of the returned model-identification-string, an exclusive-OR operation with a predetermined byte-constant.

6. A method as in claim 5 wherein the predetermined byte-constant comprises a hexadecimal value "5A".

7. A method as in claim 1 wherein the disk drive of the computer system comprises an IDE disk drive.

8. A method as in claim 7 wherein the disk drive of the computer system includes an integrated controller conforming to the ATA interface standard.

9. A method as in claim 1 wherein the method steps recited therein are performed by the computer system under control of software resident within a non-volatile memory.

10. A method as in claim 1 wherein the recognition table is updateable.

11. A method as in claim 1 wherein the recognition table and the configuration table are combined into one table.

12. In a computer system having a disk drive and having a configuration memory, a method of conditionally specifying to the computer system a plurality of drive parameters appropriate for the disk drive, absent any interaction with a user of the computer system, comprising the steps of:

sending a model-identification-query to the disk drive, said model-identification-query causing the disk drive to return a model-identification-string which identifies the disk drive's manufacturer and model number;

encrypting the model-identification-string returned from the disk drive, thereby forming an encrypted returned model-identification-string;

comparing the encrypted returned model-identification-string against a plurality of entries within a recognition table, said recognition table containing an entry for each of a plurality of disk drives, by vendor and model number thereof, which are each known to perform satisfactorily with the computer system, said recognition table being pre-stored within the computer system and containing, for each entry, a field specifying a pre-encrypted permissible model-identification-string for the respective entry and a field specifying a corresponding drive-type-number for the respective entry, said pre-encrypted permissible model-identification-strings being pre-encrypted in like manner as in the encrypting step, said comparing step for finding an entry within the recognition table corresponding to the returned model-identification-string, if such a matching entry is present within the recognition table, and otherwise for determining that no matching entry is present within the recognition table;

retrieving, upon finding a matching entry within the recognition table, the drive-type-number corresponding thereto; and storing, upon retrieving a drive-type-number from the recognition table, the retrieved drive-type-number into the configuration memory of the computer system;

whereby the drive parameters appropriate for the disk drive are specified to the computer system by reference to a pre-stored configuration table using the retrieved drive-type-number previously stored within the configuration memory, said configuration table containing, for each drive-type-number from a group of known drive-type-numbers, a corresponding plurality of drive parameters.

13. A method as in claim 12 wherein the encrypting step comprises the step of performing, for each byte of the returned model-identification-string, an exclusive-OR operation with a predetermined byte-constant.

14. A method as in claim 13 wherein the predetermined byte-constant comprises a hexadecimal value "5A".

15. A method as in claim 12 wherein the disk drive of the computer system comprises an IDE disk drive.

16. A method as in claim 15 wherein the disk drive of the computer system includes an integrated controller conforming to the ATA interface standard.

17. A method as in claim 12 wherein the method steps recited therein are performed by the computer system under control of software resident within a non-volatile memory.

18. A method as in claim 12:
wherein the modal-identification-string returned from the disk drive includes a plurality of drive parameters appropriate for the disk drive; and
wherein each of the plurality of permissible model-identification-strings stored within the recognition table includes a plurality of drive parameters appropriate for a disk drive corresponding to the respective entry; and
wherein the comparing step finds a matching entry within the recognition table only if the plurality of drive parameters contained within the returned model-identification-string matches an entry within the recognition table.

19. A method as in claim 12 wherein the reception table is unpdateable.

20. A method as in claim 12 wherein the recognition table and the configuration table are combined into one table.

* * * * *